United States Patent Office 3,430,787
Patented Mar. 4, 1969

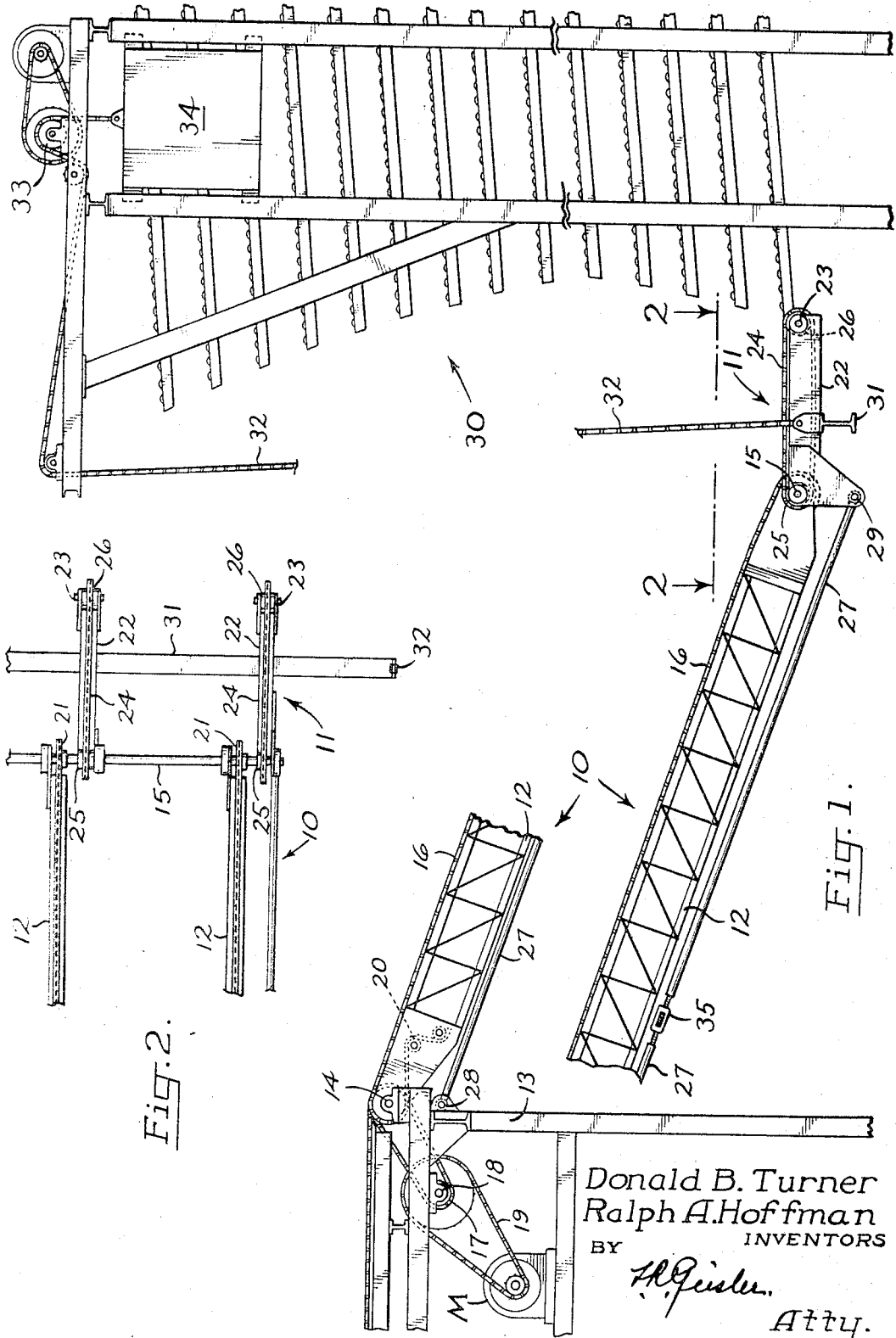

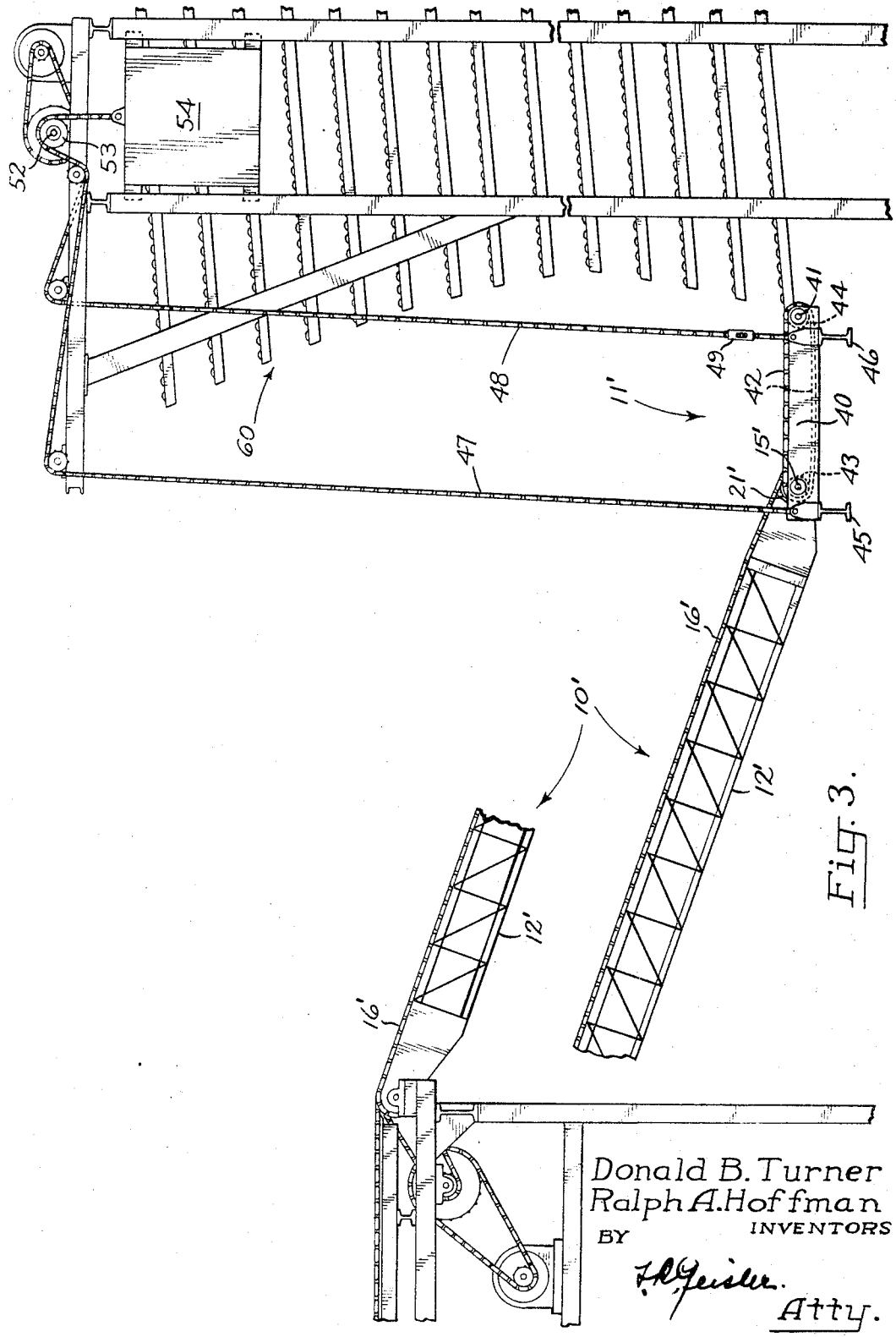

3,430,787
COMPOSITE TIPPLE DEVICE
Donald B. Turner and Ralph A. Hoffman, Portland, Oreg., assignors to Moore Dry Kiln Company of Oregon, North Portland, Oreg., a corporation of Oregon
Filed Sept. 1, 1967, Ser. No. 665,706
U.S. Cl. 214—16.4   2 Claims
Int. Cl. B65g 37/00

ABSTRACT OF THE DISCLOSURE

A transfer device with the discharging end pivotally mounted on a stationary support and the receiving end movable up and down in registry with the decks of the material sorting apparatus, the transfer device comprising a main tipple and a secondary tipple connected to the free end of the main tipple, the secondary tipple so mounted that its angle of inclination will not vary during the up and down movement of the receiving end of the device, thereby enabling the material being transferred to proceed more satisfactorily onto the main tipple regardless of the momentary slope of the main tipple.

Background of the invention

Transfer devices commonly known as "tipples" have long been used in the lumber industry for transferring lumber, plywood panels, veneer sheets, etc., to or from a common transfer point from or to a multideck assembly. Their general method of operation and manner of employment are well known in the art.

The present invention is concerned especially with the transferring of lumber from a multiple deck sorter, on the separate decks of which lumber is accumulated, to a common delivery location, where, for example, the transferred lumber is fed to a stacking mechanism.

In the lumber sorter in question, the decks are parallel, are arranged one above the other, and all slope downwardly from the receiving to the discharging end, enabling the lumber to slide sideways downwardly along the deck onto which it is sorted, the decks being provided with suitable rollers to facilitate the sliding of the lumber along the decks, and the decks having stop gates at their lower discharge ends for holding the lumber on each deck pending the transfer of the same.

The common delivery location, to which the lumber is transferred as it is removed from each deck of the sorter in turn, and at which location the discharging end of the transfer tipple is pivotally mounted, will be positioned at some point usually having an elevation higher than that of the bottom deck of the sorter and much lower than that of the top deck of the sorter. Consequently the transfer tipple, when its receiving end is moved into registry with one of the upper decks of the sorter, will slope downwardly at a much steeper incline than the sorter deck. On the other hand, when the receiving end of the tipple is moved into registry with a deck in the bottom of the sorter, the tipple will slope upwardly from the discharging end of the downwardly sloping deck.

A tipple is provided with two or more endless traveling belts or chains carrying lugs which are contacted by the lumber being transferred and which cause the lumber to move at uniform speed along the tipple. However, certain problems are presented in the removal of the lumber from the upper decks of the sorter, with the tipple sloping downwardly at a much steeper incline than the sorter deck, and also in the removal of the lumber from the lower decks, with the tipple inclined upwardly. When the stop gate is raised on a deck of the sorter to enable the lumber accumulated thereon to slide along the deck and onto the tipple the freed lumber may at times exert considerable thrust as it contacts the tipple. Against this thrust the lugs on the moving chains of the tipple exert a retarding force, holding the lumber back to allow it to proceed only at the speed at which the conveying chains on the tipple are traveling. But when the tipple is sloping downwardly with a steep slope, and thus when the lumber is being removed from the upper decks of a sorter, the thrust on the lumber as it encounters the top intake end of the tipple will often produce a lifting force on some of the pieces of lumber and cause them to ride up over others, thus breaking up the orderly smooth flow of lumber onto and along the tipple.

A somewhat similar though less serious problem is presented at times when lumber from a lower deck passes onto the upwardly sloping tipple. When a piece of lumber is not exactly perpendicular to the longitudinal center line of the sorter deck as it transfers onto the tipple, one end of a lumber piece comes into contact with the lugs on the tipple chain before the other. This causes the board to bridge obliquely across the trough made between the discharging end of the sorter deck and the intake end of the upwardly sloping tipple and increases any tendency of subsequent boards to "slue" or to move out of perpendicularity with the longitudinal line of travel. When the boards are not straight on the tipple this creates problems at the discharging end of the tipple where the boards must pass onto the stacking or other equipment.

One attempt to overcome the problem involved in moving lumber from the upper decks of the sorter has consisted in making a downward bend in the tipple frame near the intake end of the tipple so that the intake end would have approximately the same slope as a top deck. This enabled the thrust of the lumber coming off the upper decks to be absorbed in the changed receiving end portion of the tipple before reaching the steeply descending main portion of the tipple. However, when this modified tipple was used to transfer lumber from the lower decks of the sorter then the bend in the intake end of the tipple frame caused the receiving end of the tipple to slope upwardly at a considerably greater angle than the main portion of the tipple and consequently the alleviating of the problem of removing lumber from the upper decks of the sorter was achieved only by increasing the problem involved in removing lumber from the lower decks.

It has been recognized that the problems involved in removing lumber from the upper decks and also from the lower decks of the sorter with the employment of an ordinary tipple could be largely remedied by considerably increasing the length of the tipple, since the greater tipple length obviously would render the declination of the tipple from the upper decks and the inclination of the tipple from the lower decks to the common delivery location at the pivotal mounting for the tipple correspondingly less. However, it has also been recognized that such considerable increase in the tipple length would be impractical since this would require much more space, and space is nearly always at a premium in such installation. Further, a considerably increased tipple length would increase strength requirement and construction costs of the tipple, would require increased amount of transfer chains and chain races material, increased horsepower for operating the transfer chains and for manipulating the free end of the tipple, and would require more time for the transferring of the material from the separate decks of the sorter, since the stacking operator ordinarily must complete the transfer from one deck before starting on another.

The object of the present invention is to eliminate the particular problems above indicated in the transferring of the material from the various decks of the sorter, specifically from the upper decks and also to a less extent from the lower decks, without requiring a greater tipple length, but, on the contrary, by keeping the overall length of the tipple at a minimum, and without interfering with the desired smooth continuous transfer of the material from each deck separately.

*Summary of the invention*

The conveyor tipple assembly of the present invention includes two sections or two tipples. The main section or main tipple extends from the common delivery location and discharging end of the tipple, where the tipple has its pivotal mounting as customary, to within a relatively short distance from the discharging ends of the decks of the sorter to be served. The other section or secondary tipple bridges the gap between the receiving end of the main tipple and the discharging ends of the sorter decks, is connected to the receiving end of the main tipple by a pivotal or hinge mounting, and is also provided with support means so arranged that the secondary tipple will be maintained at a constant fixed angle of inclination regardless of the up and down movement of the free or receiving end of the entire tipple assembly.

*Brief description of the drawings*

In the drawings:

FIG. 1 is a foreshortened side elevation, more or less diagrammatic, of the conveyor tipple assembly, showing one way in which the secondary tipple may be maintained at a constant fixed angle of inclination in the up and down swing of the assembly;

FIG. 2 is a fragmentary plan section taken on line 2—2 of FIG. 1; and

FIG. 3 is a foreshortened side elevation of the tipple assembly, very similar to FIG. 1, but illustrating another way in which the secondary tipple may be maintained at a constant fixed angle of inclination.

In FIG. 1 the main tipple is indicated in general by the reference 10 and the secondary tipple by the reference 11. The main tipple consists of a composite rigid frame structure including a plurality of identical, laterally-spaced, longitudinally-extending beams 12, one of which is shown in FIG. 1, connected by suitable cross-braces (not shown). The main tipple is pivotally supported at its discharging end on a suitable structure indicated at 13, the longitudinally-extending beams 12 being mounted on a cross shaft 14 carried on the support 13. The opposite end of the main tipple carries a cross shaft 15 on which the secondary tipple 11 is pivotally mounted.

A plurality of endless transfer chains 16 are carried on the main tipple and pass over drive sprockets 17 secured on a cross shaft 18, the cross shaft 18 being driven through a sprocket and chain connection 19 with a motor M. Suitable tighteners, indicated at 20 in FIG. 1 are provided for the transfer chains 16, and the transfer chains pass around sprockets 21 secured on the cross shaft 15 at the opposite or free end of the main tipple. The transfer chains 16 are provided with the customary, regularly-spaced lugs (not shown) for engaging the lumber or other material delivered onto the tipple so as to cause the same to be moved along the tipple to its discharging end. The main tipple is more or less conventional as so far described and further details of its actual construction accordingly are not necessary.

The secondary tipple 11 consists of a plurality of short, longitudinally-extending frame members 22, preferably corresponding in number to the longitudinal beams 12 on the main tipple. The frame members 22 are pivotally supported on the cross shaft 15 and these frame members similarly carry a cross shaft 23 at their outer or free end.

A plurality of endless transfer chains 24, similar to and preferably corresponding in number to the transfer chains 16 on the main tipple, are carried on the secondary tipple 11. These transfer chains 16 pass around sprockets 25 secured on the cross shaft 15, and since the cross shaft 15 is rotated by the sprockets 21 around which the transfer chains 16 of the main tipple 10 pass, the transfer chains 24 are driven in unison with the transfer chains 16.

A plurality of tie rods 27, positioned below the main tipple 10 and extending substantially parallel to the beams 12 of the main tipple, each have one end pivotally secured on a cross shaft 28 mounted on the support structure 13 and the other end pivotally mounted on a cross shaft 29 carried by the frame members 22 of the secondary tipple 11. Preferably, but not necessarily, the cross shaft 28 is in vertical alignment with the cross shaft 14. Also preferably, these tie rods are adjustable in length, with each being composed of two sections having threaded extensions connected by the turnbuckle 35, as indicated in FIG. 1. As apparent, the function of the tie rods is to hold the secondary tipple in a predetermined desired fixed angle of inclination regardless of the up and down movement of the free end of the entire tipple assembly and regardless of the slope of the main tipple of the assembly.

In FIG. 1 the discharging end of a multiple deck lumber sorting apparatus 30 of well known construction is shown. The various decks of the sorter all have the same slope, each deck being provided with a suitable stop gate (not shown) near its discharging end, enabling the lumber on that deck to slide down along the rollers on the deck and to be discharged from the deck when the stop gate is raised.

A cross support beam 31 extends under and is secured to the frame members 22 of the secondary tipple. The ends of this support beam are connected respectively to a pair of lifting chains 32, one of which is shown in FIG. 1, which pass around a pair of drive sprockets 33 respectively secured on a drive shaft operated by a reversible motor, a counterweight 34 preferably being attached to the end of each lifting chain.

In the modification shown in FIG. 3 a similar main tipple 10' is shown pivotally mounted in the same manner as previously described with reference to FIG. 1, having the longitudinally-extending beams 12' carrying the cross shaft 15' at the free end of the main tipple, with the endless transfer chain 16' passing around the sprockets 21' secured on the cross shaft 15'.

The secondary tipple 11', like the secondary tipple 11 of FIG. 1, includes longitudinally-extending frame members 40 which are pivotally mounted on the cross shaft 15' on the free end of the main tipple and which in turn carry a cross shaft 41 on their opposite ends. The secondary tipple similarly is equipped with endless transfer chains 42 which pass around drive sprockets 43 secured on the cross shaft 15', thus causing the transfer chains 42 to be driven from and in unison with the transfer chains of the main tipple. The transfer chains 42 pass around sprockets 44 at their other end, the sprockets 44 being mounted on the cross shaft 41.

In FIG. 3 the discharging end of a multiple deck sorting apparatus is indicated in general by the reference 60, this lumber sorting apparatus being substantially the same as the apparatus 30 in FIG. 1. In the modified arrangement illustrated in this figure a pair of cross support beams 45 and 46 extend under and are secured to the frame members 40 of the secondary tipple 11'. The ends of the first cross support beam 45 are connected respectively to a pair of lifting chains 47, one of which is shown in FIG. 3. Similarly the ends of the second cross support beam 46 are connected respectively with a pair of supporting chains 48, one of which is shown in FIG. 3, and each of which preferably includes a length-adjusting element 49.

Each chain 47 passes around suitable guide pulleys and around a drive sprocket 53 secured on the drive shaft 52, and each chain 48 similarly passes around suitable guide pulleys and around an identical drive sprocket 53 on the shaft 52. The drive shaft 52 is operated by a reversible motor. Thus the pairs of chains 47 and 48 are raised or lowered in unison. Preferably a counterweight 54 is connected to adjacent ends of the chains 47 and 48 at each side of the sorter.

Since the pair of cross shafts 45 and 46 are raised or lowered in unison by their respective pairs of chains, the desired angle of inclination of the secondary tipple 11' (as determined by the relative length with respect to each other of the chains for the two cross shafts), is constantly maintained during the up and down movement of the composite tipple device. By having an adjustable element, such as the turnbuckle indicated at 49, in each of the chains 48, enabling that pair of chains to be adjusted in length with respect to the other pair of chains, it is possible, if so desired, to make a minor adjustment in the angle of inclination of the secondary tipple, just as an adjustment in the tie rods 27 in the construction illustrated in FIG. 1 would enable the slope or angle of inclination of the tipple 11 to be adjusted, as previously mentioned.

In either of the constructions illustrated, when the secondary tipple 11 or 11', constituting the receiving end of the entire tipple assembly, is brought into registry with the deck of the sorter which is to be unloaded, the secondary tipple will receive and absorb the thrust of the lumber as is passes from the deck of the sorter, and since the secondary tipple always maintains the same desired angle of inclination for which it has been set, the slope of the secondary tipple will be very similar to, if not the same as, the slope of the decks of the sorter, and the thrust of the lumber as it passes from the discharging deck onto the secondary tipple will be absorbed without any problem. As the lumber is received onto the secondary tipple it is carried along on the secondary tipple, the chains of which are traveling at the same speed as the chains of the main tipple, until it reaches the main tipple, whereupon it is transferred to the main tipple, and this transfer takes place without any problem regardless of the momentary slope of the main tipple. In consequence, the transition of the material from each sorter deck onto the main tipple through the intermediary of the secondary tipple is accomplished under the same optimum condition regardless of which deck is being unloaded. Furthermore, since there is no problem in transferring from the secondary tipple to the main tipple, a relatively steep slope on the main tipple can be tolerated, and the invention thereby enables the overall length of the entire tipple assembly to be kept at a minimum which, as previously indicated, is highly desirable.

Thus the object of the invention and the advantages obtainable with its employment are achieved similarly whether the invention is carried out in the manner llustrated in FIG. 1, in which the free end of the composite tipple device is raised or lowered by the pair of chains 32 and the constant slope of the secondary tipple is maintained by the tie rods 27 in a substantially planagraph arrangement, or whether the modified construction of FIG. 3 is followed in which the free end of the composite tipple device is raised or lowered by the pair of chains 47 and the desired predetermined angle of inclination of the secondary tipple is maintained by the second and cooperating pair of chains 48.

Various minor modifications would be possible in the construction, mounting and arrangement of portions of the composite tipple device without departing from the principle of the invention or the scope of the claims, but the two examples illustrated are regarded as the preferred constructions for the carrying out of the invention.

We claim:

1. A composite tipple device with a multideck sorter and a common delivery station for transferring material from the individual decks of said multideck sorter to said common delivery station, said device including a main tipple, a support for said main tipple at the common delivery station, the discharging end of said main tipple pivotally mounted on said support so as to enable said main tipple to be swung up and down, a secondary tipple pivotally mounted on the opposite free end of said main tipple to swing up and down relatively with respect to said main tipple, endles conveyor elements carried on said main tipple, means mounted on said support for driving said conveyor elements, a second set of endless conveyor elements carried on said secondary tipple, means operated by said first mentioned conveyor elements of said main tipple for driving said second set of conveyor elements on said secondary tipple, tie rods mounted parallel to and located below said main tipple and connected with said secondary tipple and with said support for said main tipple and so arranged that the angle of inclination of said secondary tipple will not change with the up and down swing of said main tipple, screw means to adjust the length of the tie rods thereby permitting the angle of inclination of the secondary tipple to be adjusted, and hoist means mounted on the multideck sorter for moving said composite device up and down to bring the free end of said secondary tipple into registry with the decks of the multideck sorter, whereby when material is transferred from a deck of said multideck apparatus by said composite device said secondary tipple will facilitate the transition of the material onto said main tipple.

2. In a multideck sorter and a spaced common delivery station a composite tipple device for transferring material from the individual decks of said multideck sorter to said common delivery station, said device including a main tipple, a support for said main tipple at the common delivery station, the discharging end of said main tipple pivotally mounted on said support so as to enable said main tipple to be swung up or down, a secondary tipple pivotally mounted on the opposite free end of said main tipple to swing up and down relatively with respect to said main tipple, endless conveyor elements carried on said main tipple, means mounted on said support for driving said conveyor elements, a second set of endless conveyor elements carried on said secondary tipple, means for driving said second set of conveyor elements, and hoist means mounted on said multideck sorter for moving said composite device up and down so as to bring the free end of said secondary tipple into registry with the decks of the multideck sorter, whereby when material is transferred from the decks of said multideck sorter by said composite device said secondary tipple will facilitate the transition of the material from a deck of the sorter onto said main tipple, said hoist means including a first and second pair of chains and operatively connected to said secondary tipple to maintain the angle of inclination of the secondary tipple substantially constant during the vertical movement of the tipples, screw type variable length means mounted on one of said pair of chains adjacent the secondary tipple to permit the angle of inclination of the secondary tipple to be varied.

References Cited

UNITED STATES PATENTS

| 509,976 | 12/1893 | Van Stansoen. | |
| 1,305,501 | 6/1919 | Steele | 214—6 X |
| 1,903,102 | 3/1933 | Farley | 214—16.6 X |
| 3,268,098 | 8/1966 | Thomas et al. | 214—16.4 |
| 2,658,630 | 11/1953 | Melin | 214—91 X |

GERALD M. FORLENZA, Primary Examiner.

R. B. JOHNSON, Assistant Examiner.

U.S. Cl. X.R.

198—91